United States Defensive Publication [19] (H) [11] T102,603

McIntyre [43] Jan. 4, 1983

[54] TABLE SYRUP CONTAINING BUTTER OR BUTTER OIL

[75] Inventor: Christopher McIntyre, Middletown, N.Y.

[73] Assignee: Hercules Incorporated, Wilmington, Del.

[21] Appl. No.: 112,059

[22] Filed: Jan. 14, 1980

[51] Int. Cl.[3] ..... A23L 1/09

[52] U.S. Cl. ..... 426/613; 426/658; 426/653; 426/654

[57] ABSTRACT

A table syrup is disclosed consisting essentially of an aqueous phase containing at least about 65% sugar having emulsified therein about 1 to 40% butter, based on the total emulsion weight and about 0.05 to 0.4% of a stabilizer consisting of 20–35% pectin, 35–50% carrageenan, 15–30% locust bean gum, and 5–20% potassium citrate. Such syrups are much more easily homogenized than are presently known syrups of this type and are characterized by good stability of the oil droplet throughout the aqueous phase.

1 Claim, No Sheets Drawing,

4 Pages Specification

The file of this unexamined application may be inspected and copies thereof may be purchased (849 O.G. 1221, Apr. 9, 1968).